(12) United States Patent
Adrian

(10) Patent No.: US 6,722,128 B1
(45) Date of Patent: Apr. 20, 2004

(54) BLOW-OFF VALVE

(76) Inventor: John Adrian, 306 Attunga Road, Yowie Bay, N.S.W. 2228 (AU)

( * ) Notice: Subject to any disclaimer, the term of this patent is extended or adjusted under 35 U.S.C. 154(b) by 0 days.

(21) Appl. No.: 10/272,615

(22) Filed: Oct. 16, 2002

(51) Int. Cl.[7] .............................................. F02D 23/00
(52) U.S. Cl. ............................. 60/600; 60/601; 60/611; 123/564
(58) Field of Search .................... 60/600, 611, 601; 123/564

(56) References Cited

U.S. PATENT DOCUMENTS

| | | | |
|---|---|---|---|
| 4,452,044 A | | 6/1984 | Iwamoto et al. |
| 4,696,165 A | * | 9/1987 | Bucher .................. 60/611 |
| 4,826,412 A | * | 5/1989 | Kubo et al. ............. 123/564 |
| 5,526,645 A | * | 6/1996 | Kaiser ..................... 60/611 |
| 6,112,523 A | * | 9/2000 | Kamo et al. .............. 60/600 |
| 6,276,139 B1 | * | 8/2001 | Moraal et al. ............ 60/611 |
| 6,363,721 B1 | * | 4/2002 | Prenninger et al. ....... 60/611 |
| 6,457,312 B2 | * | 10/2002 | Fahringer et al. ........ 60/611 |

* cited by examiner

*Primary Examiner*—Sheldon J. Richter
(74) *Attorney, Agent, or Firm*—Harrison & Egbert

(57) ABSTRACT

A blow-off valve apparatus is used in an internal combustion engine having a supercharger. The apparatus has an inlet for receiving compressed air from the compressor of the supercharger, and two outlets, one of which exhausts the air to atmosphere and the other, of which is connected to the compressor inlet, to direct some of the air back to the compressor. The apparatus includes a sleeve configured for variably closing the outlets so as to vary the proportion of the air exhausted, relative to that directed back to the compressor. The sleeve can be moved manually by an actuator. A further sleeve is configured for shutting off the outlets when the engine conditions do not require air to be diverted by the apparatus, and to open them when the engine conditions are suitable.

26 Claims, 3 Drawing Sheets

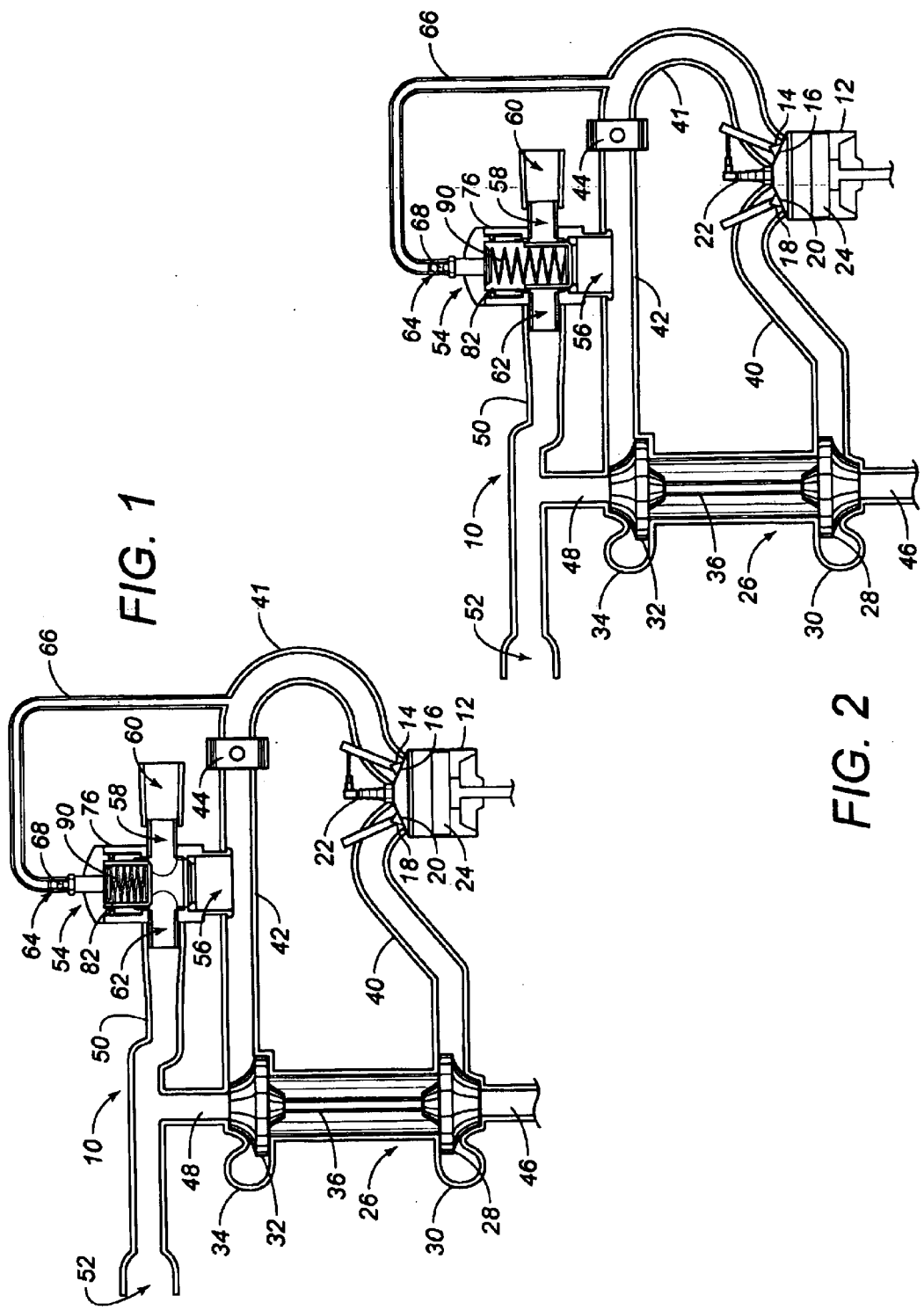

BLOW-OFF VALVE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to an internal combustion engine, to a method of handling compressed gas in an internal combustion engine, and to a blow-off valve apparatus and a system for use in an internal combustion engine.

BACKGROUND OF THE INVENTION

Superchargers are utilized in internal combustion engines to increase volumetric efficiency of the engines and thereby to enhance the performance of the engines. When the throttle of such an engine closes during operation, certain detrimental effects can result. These include a build-up of pressure downstream of the throttle with a resultant undesirable increase in heat, a rapid deceleration of the supercharger compressor with a resultant increase in potentially damaging or wearing forces on the compressor, excessive and unpleasant noise effects, and an increase in the ratio of fuel in the fuel/air mixture supplied to the engine which results in the engine running rich.

In an attempt to overcome at least some of these disadvantages, a blow-off valve (also known as a by-pass valve or anti-surge valve) may be provided downstream of the supercharger compressor outlet. Such a valve is configured to direct, at the appropriate time, some of the compressed air from the compressor, back to the air inlet of the compressor. However, such a valve also has disadvantages. For instance, the use of such a valve effectively results in the same content of air being circulated and re-circulated through the compressor and blow-off valve, with the result that the air becomes heated, both by the compressor and the surrounding engine. This increased temperature of the air has detrimental effects on the performance of the engine.

It is an object of the invention to overcome or ameliorate at least one of the disadvantages of the prior art or to provide a useful alternative.

BRIEF SUMMARY OF THE INVENTION

According to a first aspect of the invention, there is provided, in an internal combustion engine having a compressor for supercharging the engine, the compressor including a compressor inlet for receiving gas to the compressor and a compressor outlet for expelling compressed gas from the compressor, a method of handling expelled compressed gas, the method including the steps of:

exhausting a first portion of the compressed gas to atmosphere after setting variable first control means configured for varying the volume flow rate of exhaustion of the first portion; and directing a second portion of the compressed gas to the compressor inlet.

Preferably, the step of directing the second portion is carried out after setting variable second control means configured for varying the volume flow rate of the second portion. The setting of the first control means is preferably interdependent on the setting of the second control means.

In a preferred embodiment, the engine includes gas piping connected in fluid-flow communication with the compressor outlet and an engine throttle in the piping spaced from the compressor outlet, the steps of exhausting a first portion and directing a second portion being carried out on the expelled compressed gas between the compressor outlet and the throttle.

According to a second aspect of the invention, there is provided a blow-off valve apparatus for use in an internal combustion engine having a compressor for supercharging the engine, the compressor including a compressor inlet for receiving gas to the compressor and a compressor outlet for expelling compressed gas from the compressor, the apparatus including:

an apparatus inlet configured for connection in fluid-flow communication to the compressor outlet for receiving expelled compressed gas from the compressor;

a first apparatus outlet configured to exhaust, to atmosphere, a first portion of the gas received by the apparatus inlet;

variable first control means configured for varying the volume flow rate of exhaustion of the first portion through the first apparatus outlet; and a second apparatus outlet configured for being connected in fluid-flow communication to the compressor inlet and for directing a second portion of the gas received by the apparatus inlet, to enable the second portion to be returned to the compressor inlet when the second apparatus outlet is connected to the compressor inlet.

Preferably, the apparatus includes variable second control means configured for varying the volume flow rate of the second portion through the second apparatus outlet.

The first control means is preferably a first closure configured for variably closing the first apparatus outlet and the second control means is preferably a second closure configured for variably closing the second apparatus outlet. Preferably the first and second closures are interdependently operable and they preferably constitute part of a single closure element.

In a preferred embodiment, the apparatus includes a housing having a cylindrical portion, the first and second apparatus outlets opening through the cylindrical portion. The single element is preferably constituted by a cylindrical first sleeve disposed substantially coaxially within the cylindrical portion, the first sleeve being configured to variably close the first apparatus outlet and the second apparatus outlet.

Preferably the first sleeve defines a pair of apertures and is rotatable relative to the housing for bringing at least one of the apertures into and out of alignment with the first apparatus outlet and at least the other of the apertures into, and out of, alignment with the second apparatus outlet. In a preferred embodiment, the apertures are larger than the apparatus outlets, the sleeve being configured for respectively variably closing each apparatus outlet while not restricting the other apparatus outlet.

The apparatus preferably includes an actuator connected to the first sleeve for rotating the first sleeve relative to the housing. Preferably the actuator is disposed outside the housing.

In a preferred embodiment, the apparatus includes a shut-off means for substantially preventing the expelled compressed gas from being received to the apparatus via the apparatus inlet. The shut-off means is preferably a barrier for closing the first and apparatus outlets. Preferably, the barrier is a second sleeve disposed coaxially within the cylindrical portion, and more preferably coaxially within the first sleeve. Preferably the second sleeve is axially movable relative to the cylindrical portion of the housing for closing the apparatus inlet and apparatus outlet.

The apparatus preferably includes a spring means for urging the second sleeve to a closure position to close the apparatus inlet and apparatus outlet, and opening means for moving the second sleeve from the closure position. Preferably the opening means includes a vacuum connector configured to enable a partial vacuum pressure to be applied thereto to urge the second sleeve, from the closure position against the urging of the spring means.

According to a third aspect of the invention, there is provided a system for use in a internal combustion engine, the system including:

a compressor for supercharging the engine, the compressor having a compressor inlet for receiving gas to the compressor and a compressor outlet for expelling compressed gas from the compressor; and an apparatus according to the second aspect of the invention wherein the apparatus inlet is connected in fluid-flow communication to the compressor outlet and the second apparatus outlet is connected in fluid-flow communication to the compressor inlet.

According to a fourth aspect of the invention there is provided an internal combustion engine including:

at least one combustion cylinder having a cylinder fuel/air inlet and a cylinder exhaust outlet;

a compressor for supercharging the engine, the compressor having a compressor inlet for receiving gas to the compressor and a compressor outlet for expelling compressed gas from the compressor, piping which connects, and which establishes fluid-flow communication between the compressor outlet and the cylinder fuel/air inlet; and an apparatus according to the second aspect of the invention wherein the apparatus inlet is connected in fluid-flow communication to the piping and the first apparatus outlet is connected in fluid-flow communication to the compressor inlet.

Preferably, the compressor is a turbo-charging compressor being connected to a turbine, and the cylinder exhaust outlet is connected in fluid-flow communication to the turbine to enable exhaust gases exiting the at least one cylinder to drive the turbine in rotation.

In this specification, the term "to atmosphere" and similar terminology where it appears, is to be understood to mean to the ambient surroundings.

It will be appreciated that the invention, at least in certain preferred embodiments, allows for the control of undesirable sound emitted by the engine due to air passing through the blow-off valve, and for keeping the air that is forced into the engine at a cooler temperature. Furthermore, in certain embodiments, by allowing for the fine-tuning of the proportion between the air diverted back to the compressor inlet and that exhausted to atmosphere, a desirable mixture between hot and cold air, and thus desirable overall temperature, can be achieved, and fuel consumption by the engine can be reduced.

Moreover, in certain embodiments, less decelerating force is applied to the supercharger so that, particularly where the supercharger is a turbocharger, its turbine/compressor assembly is able to continue rotating under its own inertia when the throttle is closed. This allows the lag time required to establish a desirable boost pressure, once the throttle has reopened, to be minimized.

BRIEF DESCRIPTION OF THE SEVERAL VIEWS OF THE DRAWINGS

FIG. 1 is a diagrammatic representation of an engine according to an embodiment of the invention.

FIG. 2 is a diagrammatic representation of the engine of FIG. 1 in a different stage of operation.

DETAILED DESCRIPTION OF THE INVENTION

Figure 4:
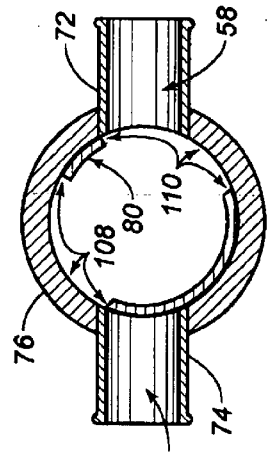
FIGS. 3 and 4 are a vertical and horizontal sectional views, respectively, through a valve device according to an embodiment of the invention in one condition of operation.

Referring to FIGS. 1 and 2, there is shown, diagrammatically, part of an internal combustion engine 10 of a motor vehicle. The engine 10 has cylinders of which, for convenience and clarity, only one 12 is shown. The cylinder 12 has a fuel/air inlet port 14, an inlet valve 16, an exhaust port 18, an exhaust valve 20, and a spark plug 22. A piston 24 is disposed within the cylinder 12.

The engine 10 also has supercharger in the form of a conventional turbocharger, generally designated 26, for supercharging the engine. The turbocharger 26 includes a turbine wheel 28 rotatably mounted in a scroll housing 30, and a compressor fan wheel 32 located in a further scroll housing 34. The compressor fan wheel 32 and scroll housing 34 together constitute a compressor, generally designated 35. The turbine wheel 28 and fan wheel 32 are connected to each other by a shaft 36, so as to be fixed in rotation with respect to each other. The scroll housing 34 has an outlet 38, which is referred to herein as a compressor outlet.

An exhaust manifold 40 connects the scroll housing 30 and the exhaust port 18 in fluid-flow communication to each other. Inlet manifold piping 41 and further inlet piping 42, which are connected to each other in series with a battery valve throttle 44 between them, connect the compressor outlet 38 and the inlet port 14 in fluid-flow communication to each other.

The scroll housing 30 has an exhaust opening 46 and the scroll housing 34 has an inlet opening 48, referred to hereafter as the compressor inlet. The compressor inlet 48, in turn, is connected to an air manifold 50 which has a manifold inlet 52.

A blow-off valve apparatus 54 is provided, which has an apparatus inlet 56 connected to the inlet piping 42, a first apparatus outlet 58 which opens to atmosphere at 60, and a second apparatus outlet 62 connected to the air manifold 50. It will be appreciated that the second apparatus outlet 62 is therefore connected in fluid-flow communication with the compressor inlet 48. A vacuum connector 64 is provided, and is connected by a hose 66 to the inlet manifold 41. The vacuum connector 64 has a serrated spigot 68 to facilitate connection of the hose 66.

Referring to FIGS. 3 to 11, the apparatus 54 is shown in more detail. As can be seen, the apparatus inlet 56, and the first and second apparatus outlets 58 and 62, respectively, are defined by spigots, 70, 72 and 74, respectively. The apparatus 54 includes a housing 76 having a cylindrical portion 78. Located coaxially within the housing 76 are a first, outer sleeve 80, and a second, inner sleeve 82.

Figure 9:
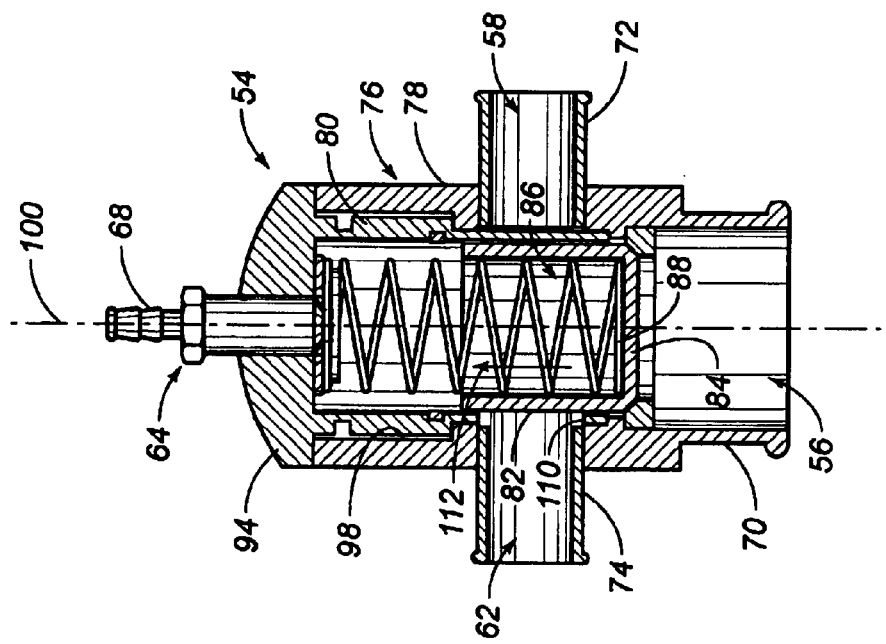
FIG. 9 is a vertical sectional view, through the valve device of FIGS. 3 and 4 in a still further condition of operation.

The inner sleeve 82 has a closed bottom 84 and thus defines a cup 86 (see particularly FIG. 9), and is slidably movable, in an axial direction, within the housing 76. One end 88 of a spring 90 is seated in the cup 86 and the other end 92 of the spring 90 is seated against the top 94 of the housing 76. The spring 90 urges the inner sleeve 82 in a downward direction as shown in FIGS. 3, 5, 7 and 9, towards a closure position as shown in FIG. 2 and 9. It will be noted that in this closure position, the inner sleeve 82 closes both of the apparatus outlets 58 and 62.

The vacuum connector 64 opens through the top 94, into the housing 76.

The apparatus 54 is configured to prevent the outer sleeve 80 from moving in an axial direction within the housing 76. However, the outer sleeve 80 is rotatable about its longitudinal axis 100 which is also the longitudinal axis of the housing 76 and the inner sleeve 82.

The top 94 of the housing is joined to the outer sleeve 80. The top 94 can be rotated by hand, as indicated by the rounded arrows in FIG. 11, to rotate the outer sleeve 80 within the housing 76. The top 94 therefore constitutes an actuator, and will be referred to hereafter as an actuator top. Recesses 102 defined in the upper surface of the actuator top 94 are provided to improve grip, to facilitate rotation of the actuator top and outer sleeve 80. The outer surface of the housing 76 is provided with a calibrated series of markings 104 and the outer rim of the actuator top 94 is provided with an indicator dot 106. Thus, the rotational position of the actuator top 94, and hence of the outer sleeve 80, relative to the housing 76, can be accurately determined by identifying the particular marking 104 with which the dot 106 is aligned.

The outer sleeve 80 has a pair of apertures 108 and 110 disposed so as to be spaced from each other around the circumference of the sleeve. By rotating the outer sleeve 80, each aperture 108 and 110 may be moved into, and out of, alignment with a the apparatus outlets 58 and 62. When the apertures 108 and 110 are out of alignment with an apparatus outlet 58 or 62, the outer sleeve 80 effectively closes that outlet.

Conversely, when an aperture 108 or 110 is in alignment with an apparatus outlet 58 or 62, the outlet is open (assuming that the inner sleeve 82 is moved out of its closure position). It will therefore be appreciated that the outer sleeve 80 constitutes a single closure element for closing the device outlets 58 and 62.

Figure 6:
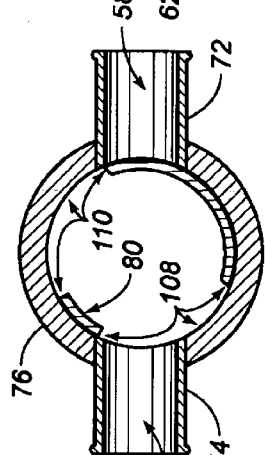
FIGS. 5 and 6 are a vertical and horizontal sectional views, respectively, through the valve device of FIGS. 3 and 4 in another condition of operation.
Figure 8:
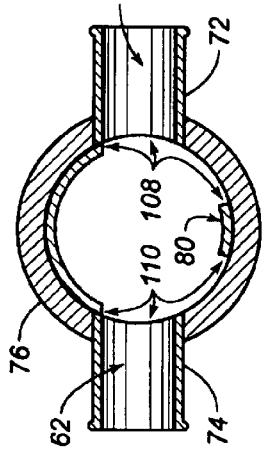
FIGS. 7 and 8 are a vertical and horizontal sectional views, respectively, through the valve device of FIGS. 3 and 4 in yet another condition of operation.
Figure 3:
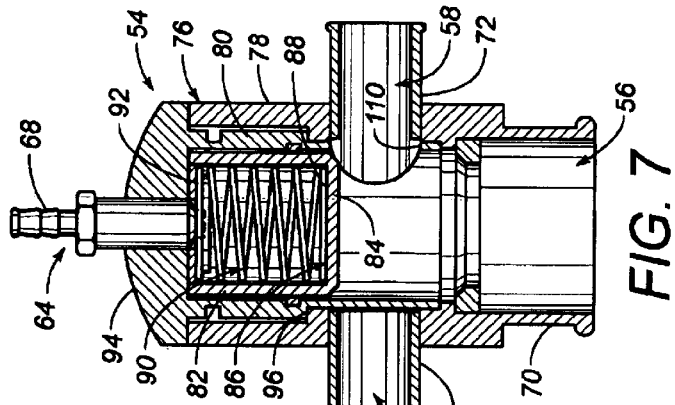
Figure 5:
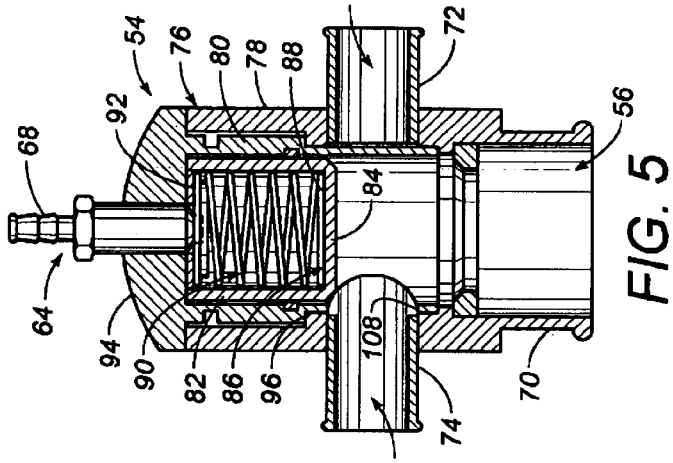
Figure 7:
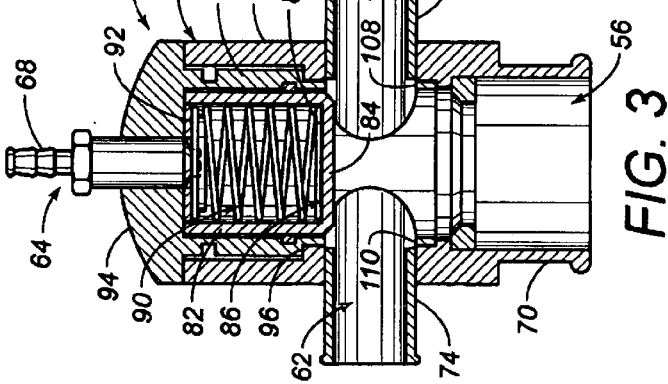
Figure 11:
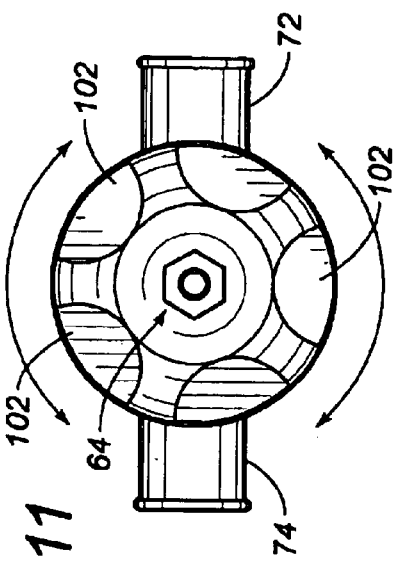
FIGS. 10 and 11 are a side elevation and plan view, respectively, of the valve device, of FIGS. 3 and 4.
Figure 10:
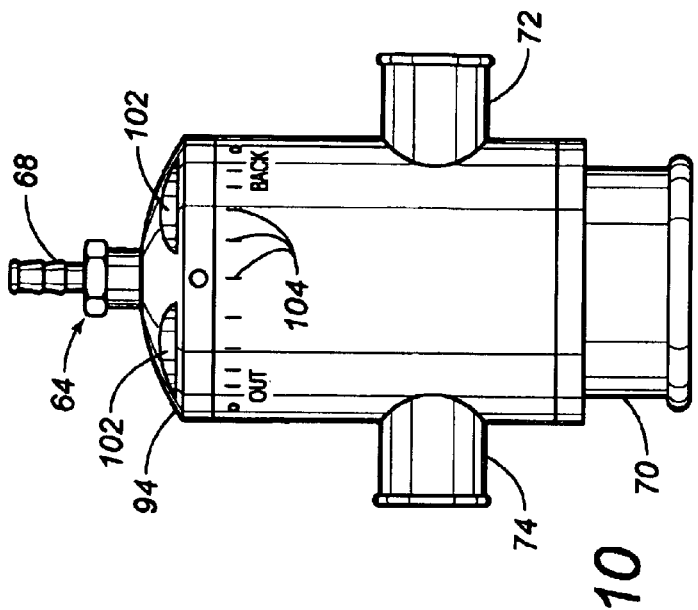

As may best be seen in FIGS. 4, 6 and 8, the apertures 108 and 110 are larger than their respective apparatus outlets 58 and 62. The size of the apertures 108 and 110 relative to the apparatus outlets 58 and 62, together with the respective positions of the apertures, allows the outer sleeve 80 to be rotated to variably close either one of the apparatus outlets, while the other apparatus outlet is completely open. With reference to FIGS. 4, 6 and 8, it will be appreciated that, in effecting such opening or closing of the apparatus outlets 58 and 62, it is not always the same aperture 108 or 110 that will open through each particular outlet.

In use, when the engine 10 is running, spent gases are exhausted from the cylinder 12 during the exhaust cycle, via the exhaust port 18, when the exhaust valve 20 is open. These gases travel along the exhaust manifold 40 to the scroll housing 30 where they drive the turbine wheel 28 in rotation, before being exhausted to atmosphere via the exhaust opening 46. The turbine wheel 28, by way of the shaft 36, rotates the compressor fan wheel 32, which, in turn, draws in air through the manifold inlet 52, into the scroll housing 34 via the compressor inlet 48. The fan wheel 32 then forces this air, under compression, via the compressor outlet 38 and the inlet piping 42, to the inlet manifold 41. From the inlet manifold 41, the compressed air, together with fuel (such as petrol) is forced into the cylinder 12 via the inlet port 14 during the induction cycle, when the inlet valve 16 is open. The manner in which fuel is mixed with the air will be understood by those skilled in the art and is not described further. As will be understood by those skilled in the art, the compression of the air by the compressor fan wheel 32, and the resultant pressure with which the air is forced into the cylinder 12, provides for significantly greater volumetric efficiency than would have been the case in the absence of the turbocharger 26, with resultant enhanced performance of the engine 10 and the motor vehicle.

It will also be appreciated by those skilled in the art that for a fuel/air mixture to be introduced via the inlet manifold 41 to the cylinder 21, the throttle 44 must be open. During normal operation of the vehicle and its engine 10, the throttle 44 will close at times of non-acceleration, such as during gear changes. When the throttle 44 has been open and compressed air has been moving along the inlet manifold 41 towards the cylinder 12, and the throttle is then caused to close, the compressed air from the turbocharger 26 is prevented from entering the cylinder. When the throttle 44 closes, and the inlet valve is open with the piston descending on its induction stroke, a suction force is applied to the inlet manifold 41. This results in a negative pressure, or partial vacuum, in the inlet manifold 41, between the throttle 44 and the cylinder 12. This partial vacuum is communicated via the hose 66 and the vacuum connector 64 to the housing 76. In the housing 76, this partial vacuum causes a force to be exerted on the inner sleeve 82, in an upward direction as indicated by the arrow 112 in FIG. 9, against the downward force of the spring 90. This upward force, combined with the positive boost pressure in the inlet piping 42, causes the inner sleeve 82 to move upwards, from its closure position as shown in FIGS. 2 and 9, to a position as shown in FIGS. 1, 3, 5 and 7. In this position, the inner sleeve 82 is no longer blocking the lint and second apparatus outlets 58 and 62. It will be appreciated that if these outlets are open, the compressed air in the inlet piping 42 can move through the apparatus inlet 56 into the housing 76. Then, a first portion of this air can exit the housing 76 by passing through the first apparatus outlet 58 so as to be exhausted to atmosphere, and a second portion of the air can exit the housing by passing through the second outlet 62, and via the air manifold 50, to the compressor inlet 48. This air then combines with air entering via the manifold inlet 52, and serves as intake air to the compressor 35.

The outer sleeve 80 can be used to control the volume flow rate of the gas being exhausted to atmosphere via the apparatus outlet 58 and that volume flow rate directed back to the compressor inlet 48 via the apparatus outlet 62, by variably closing the respective outlets. To achieve this, the outer sleeve 80 can be rotated, by turning the actuator top 94. It will be appreciated that this adjustment can be used to control the volume of air received via the apparatus inlet 56 that is exhausted to atmosphere to that volume returned to the compressor inlet 48.

As mentioned above, the position of tile outer sleeve 80, and hence the particular "setting" of the apparatus 54 can be determined by identifying the particular marking 104 with which the indicator dot 106 is aligned. By rotating the outer sleeve in this manner, the performance of the engine 10, or the sound resulting from air being exhausted to atmosphere via the apparatus outlet 58, can be adjusted. More particularly, the proportion of air returned to the compressor inlet 48, to serve again as intake air relative to the proportion exhausted to atmosphere can be adjusted so as to affect, and possibly improve, engine performance (including aspects relating to power, torque and fuel consumption) and noise characteristics. The improvement of engine performance may, as mentioned above, result from cooler air being introduced to the cylinders via the inlet manifold 41.

Although the invention is described above with reference to a particular embodiment, it will be appreciated that it may be embodied in many other forms. For example, muffling means or resonating means (designated 114 in FIG. 2), maybe connected at the apparatus outlet 58 to affect the noise characteristics of the engine, which are caused by air being exhausted to atmosphere.

In addition, instead of the apparatus 54 being fitted in an engine 10 as illustrated in FIGS. 1 and 2, it may be in the form of a retro-fit apparatus (not shown) connected to an existing blow-off valve forming part of the engine, of a type having one outlet connected in fluid-flow communication to the compressor inlet 48. In this case, outlet of the existing blow-off valve may be disconnected from the compressor inlet 48 and connected, instead, to the apparatus inlet 56 of the retro-fit apparatus. The apparatus according to the invention would then operate as described above. Also, a unidirectional valve (not shown) may be fitted at the apparatus outlet 58 to prevent the ingress of air from the surroundings to the housing 76 and hense to the engine 10.

I claim:

1. A method of handling expelled compressed gas in an internal combustion engine comprising a compressor for supercharging the engine, the compressor comprising a compressor inlet for receiving gas to the compressor and a compressor outlet for expelling compressed gas from the compressor, said method comprising the steps of:

exhausting a first portion of the compressed gas to atmosphere after setting variable first control means configured for varying volume flow rate of exhaustion of the first portion; and directing a second portion of the compressed gas to the compressor inlet.

2. The method according of claim 1, wherein said engine further comprises gas piping connected in fluid-flow communication with the compressor outlet and an engine throttle in the piping spaced from the compressor outlet, the steps of exhausting a first portion and directing a second portion being carried out on the expelled compressed gas between the compressor outlet and the throttle.

3. The method of claim 1 wherein the step of directing the second portion is carried out after setting variable second control means configured for varying the volume flow rate of the second portion.

4. The method of claim 3 wherein the setting of the first control means is interdependent on the setting of the second control means.

5. A blow-off valve apparatus for use in an internal combustion engine comprising a compressor for supercharging the engine, the compressor comprising a compressor inlet for receiving gas to the compressor and a compressor outlet for expelling compressed gas from the compressor, the apparatus comprising:

an apparatus inlet configured for connection in fluid flow communication to the compressor outlet for receiving expelled compressed gas from the compressor;

a first apparatus outlet configured to exhaust, to atmosphere, a first portion of the gas received by the apparatus inlet;

variable first control means configured for varying the volume flow rate of exhaustion of the first portion through the first apparatus outlet; and a second apparatus outlet configured for being connected in fluid-flow communication to the compressor inlet and for directing a second portion of the gas received by the apparatus inlet, to enable the second portion to be returned to the compressor inlet when the second apparatus outlet is connected to the compressor inlet.

6. The apparatus of claim 5 wherein the first control means is a first closure configured for variably closing the first apparatus outlet.

7. A system for use in an internal combustion engine, the system comprising:

a compressor for supercharging the engine, the compressor comprising a compressor inlet for receiving gas to the compressor and a compressor outlet for expelling compressed gas from the compressor, and an apparatus according to claim 5 wherein the apparatus inlet is connected in fluid-flow communication to the compressor outlet and the second apparatus outlet is connected in fluid-flow communication to the compressor inlet.

8. An internal combustion engine comprising:

at least one combustion cylinder comprising a cylinder fuel/air inlet and a cylinder exhaust outlet, a compressor for supercharging the engine, the compressor comprising a compressor inlet for receiving gas to the compressor and a compressor outlet for expelling compressed gas from the compressor, piping which connects, and which establishes fluid-flow communication between, the compressor outlet and the cylinder fuel/air inlet, and an apparatus according to claim 5 wherein the apparatus inlet is connected in fluid-flow communication to the piping and the first apparatus outlet is connected in fluid-flow communication to the compressor inlet.

9. The engine of claim 8 wherein the compressor is a turbo-charging compressor being connected to a turbine, and the cylinder exhaust outlet is connected in fluid-flow communication to the turbine to enable exhaust gases exiting the at least one cylinder to drive the turbine in rotation.

10. The apparatus of claim 5, further comprising a variable second control means configured for varying volume flow rate of the second portion through the second apparatus outlet.

11. The apparatus of claim 10 wherein the second control means is a second closure configured for variably closing the second apparatus outlet.

12. The apparatus of claim 11 wherein the first and second closures are inter-dependently operable.

13. The apparatus of claim 12 wherein the first and second closures comprise part of a single closure element.

14. The apparatus of claim 13, further comprising a housing comprised of a cylindrical portion, the first and second apparatus outlets opening through the cylindrical portion.

15. The apparatus of claim 14 wherein a single element is comprised of a cylindrical first sleeve disposed substantially coaxially within the cylindrical portion, the first sleeve being configured to variably close the first apparatus outlet and the second apparatus outlet.

16. The apparatus of claim 15 wherein the first sleeve defines a pair of apertures and is rotatable relative to the housing for bringing at least one of the apertures into, and out of, alignment with the first apparatus outlet and at least the other of the apertures into, and out of, alignment with the second apparatus outlet.

17. The apparatus of claim 16 wherein the apertures are larger than the apparatus outlets, the sleeve being configured for respectively variably closing each apparatus outlet while not restricting the other apparatus outlet.

18. The apparatus of claim 15, further comprising an actuator connected to the first sleeve for rotating the first sleeve relative to the housing.

19. The apparatus of claim 18 wherein the actuator is disposed outside the housing.

20. The apparatus of claim 15, further comprising a shut-off means for substantially preventing the expelled compressed gas from being received to the apparatus via the apparatus inlet.

21. The apparatus of claim 20 wherein the shut-off means is a barrier for closing the first and second apparatus outlets.

22. The apparatus of claim 21 wherein the barrier is a second sleeve disposed coaxially within the cylindrical portion.

23. The apparatus of claim 22 wherein the second sleeve is disposed coaxially within the first sleeve.

24. The apparatus of claim 22 wherein the second sleeve is axially movable relative to the cylindrical portion of the housing for closing the apparatus inlet and apparatus outlet.

25. The apparatus of claim 24, further comprising a spring means for urging the second sleeve to a closure position to close the apparatus inlet and apparatus outlet, and opening means for moving the second sleeve from the closure position.

26. The apparatus of claim 25 wherein the opening means comprises a vacuum connector configured to enable a partial vacuum pressure to be applied thereto to urge the second sleeve from the closure position against the urging of the spring means.

* * * * *